United States Patent [19]

Moly

[11] Patent Number: 4,831,726
[45] Date of Patent: May 23, 1989

[54] WIRING HARNESS AND METHOD FOR MANUFACTURING SAME

[75] Inventor: Jose Moly, Gratentour, France

[73] Assignee: Precision Mechanique Labinal, S.A., Montigny le Bretonneux, France

[21] Appl. No.: 187,905

[22] Filed: Apr. 29, 1988

[30] Foreign Application Priority Data

Apr. 29, 1987 [FR] France .................. 87 06101

[51] Int. Cl.⁴ .................. H01R 43/00
[52] U.S. Cl. .................. 29/857; 29/858; 29/883; 29/884; 264/272.14; 174/72 A
[58] Field of Search .............. 29/857, 564.1, 748, 29/755, 760, 33 F, 883, 884, 874, 876, 858, 860, 418, 861, 749; 264/272.11, 272.14, 272.15; 206/328, 330, 820; 361/428; 174/72 A; 248/49, 68.1; 439/34

[56] References Cited

U.S. PATENT DOCUMENTS 3,792,190 11/1972 Schultz .................. 206/330
3,836,415 9/1974 Hilderbrandt .......... 174/72 A
4,492,023 1/1985 Schneider et al. ....... 29/749
4,673,837 6/1987 Gingerich ............... 310/43

Primary Examiner—P. W. Echols
Assistant Examiner—K. Jordan
Attorney, Agent, or Firm—Sandler & Greenblum

[57] ABSTRACT

A method for manufacturing a wiring harness of the type having a preformed cable containing a plurality of conductors and arranged in a predetermined path, and having breakouts for certain of the conductors which terminate in electrical contacts at one or more predetermined locations, includes the step of molding an integral frame from insulating mateial. The frame has groups of connector housings for receiving electrical contacts, and located at positions corresponding to the locations of the breakouts, and runners that integrally connect the housings. The method also includes laying the preformed cable in an operative position on the frame so that the cable breakouts are adjacent to the groups of connector housings. After the electrical contacts are inserted into the connector housings, the runners are removed.

10 Claims, 2 Drawing Sheets

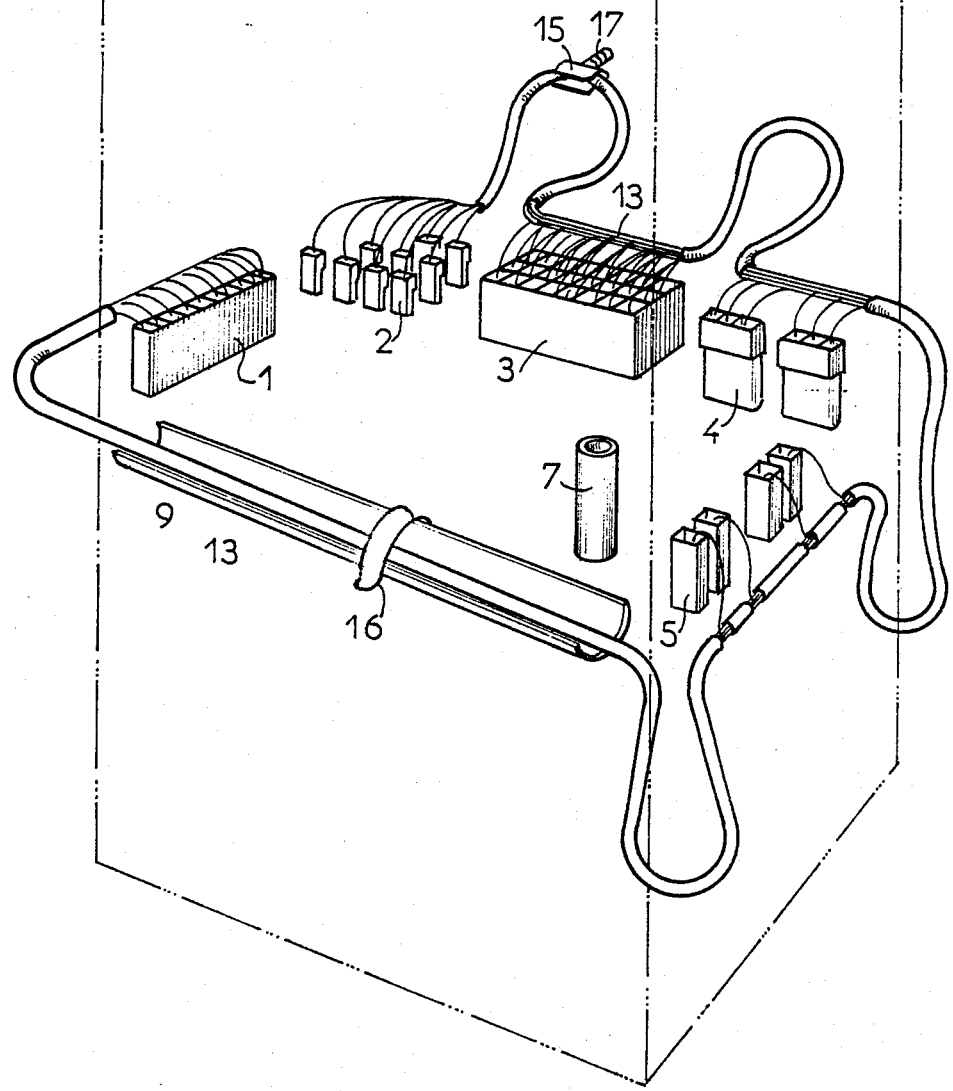

WIRING HARNESS AND METHOD FOR MANUFACTURING SAME

TECHNICAL FIELD

The present invention relates to a wiring harness and to a method for manufacturing the same.

BACKGROUND ART

Wiring required for an electrical device employing many electrical connections is often facilitated by manufacturing a harness in the form of a group of conductors provided with breakouts at locations corresponding to locations at which connections to the device must be effected, the various conductors being terminated with crimped male or female contacts that may be assembled into insulating connectors. Harnesses of this kind are prepared using a separate production line; and to effect the required electrical interconnections for an electrical device, a harness is placed on the device, and the connectors on the harness are mated with corresponding connectors on the device to effect the required electrical interconnections.

The preparation of harnesses is time consuming, costly, and requires skilled personnel. However, it is difficult to use a robot to place the contacts in the insulating connectors and place the harnesses on the machine to be wired. It is an object of the present invention to overcome these various disadvantages.

DISCLOSURE OF INVENTION

The present invention provides a method for manufacturing a wiring harness of the type having a preformed cable containing a plurality of conductors arranged in a predetermined path, and having breakouts at one or more predetermined locations for certain of the conductors which terminate in electrical contacts. The method comprises the steps of molding an integral frame from insulating material, the frame comprising groups of connector housings for receiving electrical contacts and located at positions corresponding to the positions of the breakouts in the cable, and runners that integrally connect the housings and maintain them in the desired pattern. The preformed cable is laid on the frame in an operative position so that the cable breakouts are adjacent to the groups of connector housings. Electrical contacts on the conductors are then inserted into the various connector housings; and the runners are then removed to complete the assembly of a harness. The provision of the runners interconnecting the connector housings properly positions the connector housing relative to the cable breakout locations, and also provides a rigid structure which can be handled easily, either manually or by robots, so that the cable can be accurately positioned for inserting the various contacts into the appropriate connector housings.

The invention further comprises the step of molding guide means in the form of a trough on the frame at a location that will support the cable on the frame when the cable is laid thereon in its operative position. The guide means is interconnected to the housing by runners and provides a convenient way in which to orient the cable prior to insertion of the contacts into the connector housings. The support given to the cable by the guide means properly locates each breakout in the vicinity of the appropriate connecting housings before the runners are separated from the frame. After the runners are separated, the guide means provides a support for the harness after it is connected to a device.

The invention further comprises the step of molding retainer means on the frame adjacent to and integral with the guide means. The retainer means is constructed and arranged so as to be displaceable to a position that overlies the guide means and functions as a retainer for the cable therein when the latter is supported on the guide means.

The invention may also include the step of molding clip means on the frame. The clip means be separable from the remainder of the frame for engaging with the cable and retaining the same in a desired position on a surface after the runners have been moved from the frame.

BRIEF DESCRIPTION OF DRAWINGS

An embodiment of the present invention is shown in the accompanied drawings wherein:

FIG. 3 is a diagram showing the harness fitted to a machine.

BEST MODE FOR CARRYING OUT THE INVENTION

Figure 1:
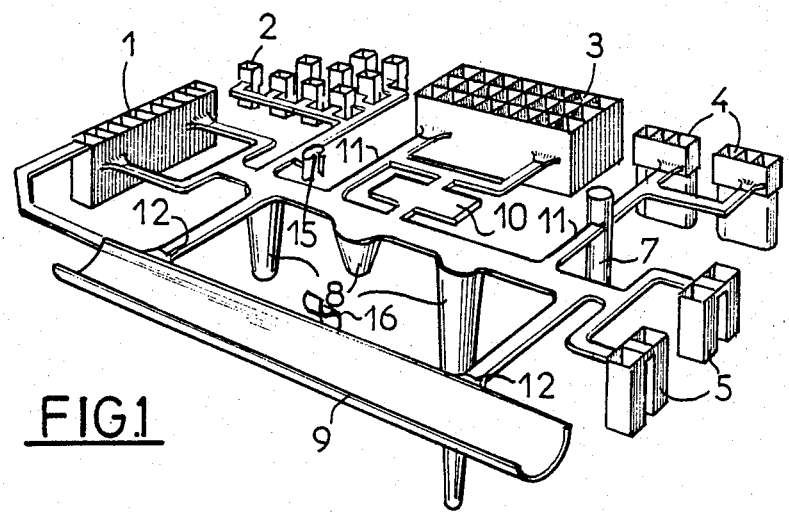
FIG. 1 is a perspective view of a frame according to the present invention showing the positioning of insulating connector housings prior to the application of a cable that is to form a wiring harness.

Referring now to the drawings, reference numeral 11 in FIG. 1 designates a frame according to the present invention, the frame comprising a plurality of insulating connector housings of various sizes for receiving electrical contacts and located at positions corresponding to the locations of the breakouts of a wiring harness to be constructed using the frame as a guide. Specifically, FIG. 1 shows insulating connector unit 1 in the form of a linear array of sockets for either male or female contacts, individual insulating sockets 2, insulating connector unit 3 in the form of three integral linear arrays of sockets, insulating connector unit 4 each having three sockets, and insulating connector unit 5 each having two sockets. All of the connector unit are interconnected by a plurality of runners such that frame 11 is established as a unitary rigid structure that may be handled easily. Preferably, all the units and runners are molded from suitable plastic material, preferably thermoplastic, as an integral unit by well known and conventional means. The various units 1, 2, 3, 4 and 5 are illustrative of many types of connectors commonly used with wiring harnesses, and FIG. 1 should not be construed as limiting the type and number of connectors which depend on the harness involved.

Figure 2:
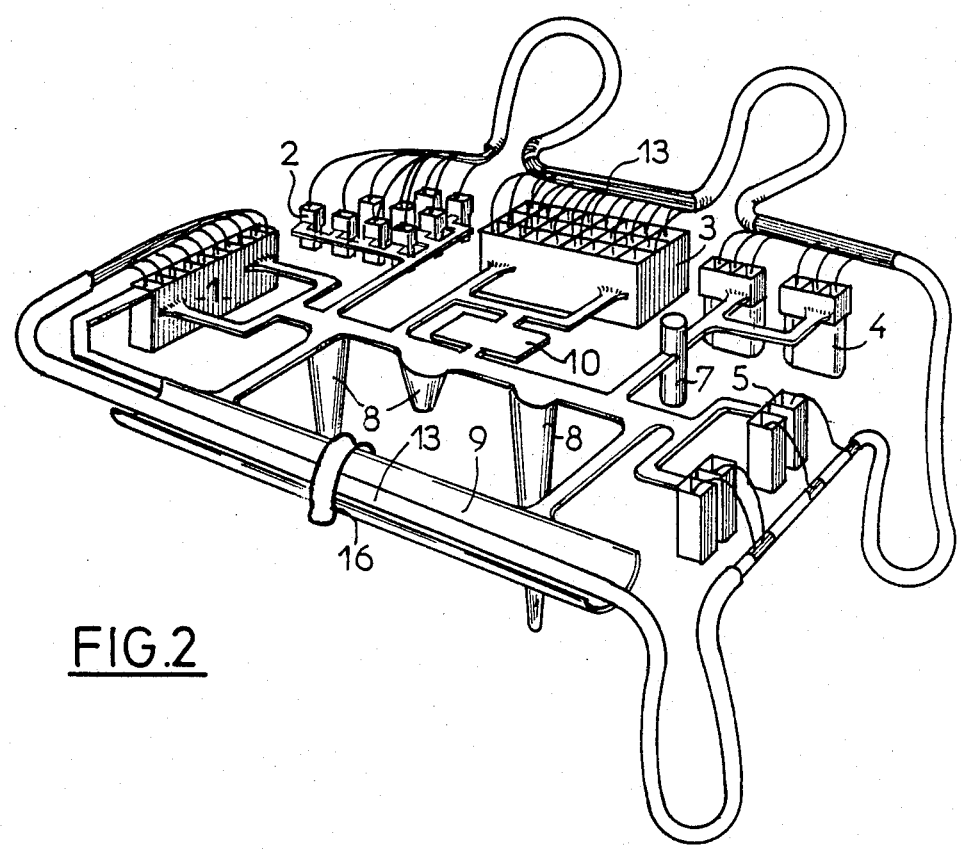
FIG. 2 is a view showing the frame shown in FIG. 1 but showing a cable assembled into a wiring harness.

In addition to the connector units described above, frame 11 may also include trough 9 forming guide means for a cable (as shown in FIG. 2) at a location that will support the cable on the frame when the cable is laid in its operative position at which the cable breakouts are positioned adjacent the connector units. Trough 9 is integrally connected to the housing units 1, 2, 3, 4, 5 by runners. While only one trough is shown, it should be understood that other troughs could be provided depending on the nature of the harness.

Integral with trough 9 is retainer means 16 which is preferably formed along one edge of the trough. Retainer means 16 is constructed and arranged so as to be displaceable from the position shown in FIG. 1 to an operative position that overlies the trough and forms a retainer for a cable when the latter is supported in the trough as shown in FIG. 2. The trough may be apertured to receive the free end of means 16.

Frame 11 further includes clip means 15 which is molded in a C-shape and connected to the frame by a runner. As shown in FIG. 3, clip means 15 may be separated from the frame by severing the runner connecting the clip means to the frame and used for securing the cable as shown in FIG. 3. Preferably, clip 15 further includes tab 17 integrally molded therewith for providing a base that fits in a suitable aperture in the device with which the wiring harness is to be used.

Frame 11 further includes a plurality of tails 8 projecting from one side of the frame. These tails may be of difference sizes and shapes for the purpose of identifying the frame to a robot when the latter is used as part of an automatic assembly operation.

Finally, frame 11 further includes label 10 in the form of a flat plate connected to the frame by runners, and tubular member 7. Label 10 may carry inditia which identifies the wiring harness that is to be assembled; and tubular member 7 may be useful in the final assembly of the harness.

Each of the insulating connector units comprises one or more sockets each of which has an opening at one end thereof to effect insertion of a male or female contact terminating a conductor. All of the openings in the insulating connector units open in the same direction to facilitate assembly of the contacts into the housings. The other ends of the connector housings are designed to mate with complimentary insulating units containing suitable male or female contacts. The complementary units are a part of the apparatus into which the wiring harness is to be assembled. Alternatively, the connector units may be provided with contacts that mate with push-on terminals of the type provided on motors or other devices, the corresponding insulating connectors constituting insulation for the push-on terminals.

Frame 11 shown in FIG. 1 is designed to be easily gripped by a robot which identifies the wiring harness by means of the size and location of tails 8. The robot is designed to mate with the various connector housings and to install the contacts terminating the cables in the wiring harness to automatically produce the assembly shown in FIG. 2. When cable 13 has been placed in trough 9 as part of the assembly operation, retainer means 16 can be folded over the trough and locked into a suitable aperture in the trough for retaining the cable securely in place.

After the contacts associated with cable 13 have been operatively inserted into the various connector housings in the manner shown in FIG. 2, the various runners associated with the frame can be removed. Separation of the runners from the components of the harness may be facilitated by providing score-lines, typically shown by reference numeral 12 in FIG. 1. The completed harness shown in FIG. 3 can then be applied to apparatus shown in the chain lines in FIG. 3 with the assurance that all of the breakouts will be properly located. One or more clips 15 molded with the frame may be provided for the purpose of supporting or guiding cable 13 properly within the apparatus into which the harness is mounted. Tab 17 provided on clip means 15 may be inserted into a constricted opening in a wall in the body in which the harness is to be used in order to properly secure conductors 13. The wiring system is designed to be installed in a machine such as a domestic electrical appliance, a vehicle, etc.

The advantage and improved results furnished by the method and apparatus of the present invention are apparent from the foregoing description of the preferred embodiment of the invention. Various changes and modifications may be made without departing from the spirit and scope of the invention as described in the claims that follow.

I claim:

1. A method for manufacturing a wiring harness of the type having a preformed cable containing a plurality of conductors and arranged in a predetermined path, and having breakouts for certain of the conductors which terminate in electrical contacts at one or more predetermined locations along the length of the cable, said method comprising the steps of:
   (a) molding a one-piece integral frame from insulating material, said frame having groups of connector housings arranged in a non-linear array for receiving electrical contacts and located at positions corresponding to the locations of the breakouts, and runners that integrally connect the housings;
   (b) placing said preformed cable in operative position relative to said frame so that the cable breakouts are adjacent to said groups of connector housings;
   (c) inserting said electrical contacts into said connector housings; and
   (d) removing said runners.

2. A method according to claim 1 including the step of molding guide means on said frame at a position that will support the cable on said frame when the cable is laid in its operative position on the frame, said guide means being integrally connected to said housing by said runners.

3. A method according to claim 2 including the step of molding retainer means on said frame adjacent to and integal with said guide means, said retainer means being constructed and arranged so as to be displaceable to a position that overlies the guide means and forms a retainer for the cable when the latter is supported on said guide means.

4. A method according to claim 3 including the step of molding clip means on said frame, separating said clip means from the remainder of said frame and engaging the clip means with the cable for retaining the same in a desired position.

5. A method according to claim 1 including the step of molding clip means on said frame, separating the clip means from the remainder of the frame, and engaging the clip means to the cable for retaining same in a desired position.

6. A method according to claim 5 including the step of molding a trough on said frame at a location that will support the cable on said frame when the cable is laid in its operative position, said trough being integrally connected to said housing by said runners.

7. A method according to claim 1 including the step of molding on said frame a flat plate containing indicia, said plate being integrally connected to said housings by a runner, said plate being adapted to be separated from said housings when the last mentioned runner is removed from said frame.

8. A method according to claim 1 including the step of molding a plurality of tails on said frame, each tail being connected to a runner for identifying the frame.

9. A method according to claim 1 including the step of molding a tubular member on said frame, said tubular member being integrally connected to said housings by a runner, said tubular member being adapted to be separated from said housings when the last mentioned runner is removed from said frame.

10. A method according to claim 1 including the step of molding the frame for a thermoplastic material.

* * * * *